(12) United States Patent
Wang et al.

(10) Patent No.: US 11,934,584 B2
(45) Date of Patent: Mar. 19, 2024

(54) FINGER ORIENTATION TOUCH DETECTION

(71) Applicant: Apple Inc., Cupertino, CA (US)

(72) Inventors: Lejing Wang, Sunnyvale, CA (US);
Martin Meloun, Cupertino, CA (US);
Ji Hyoun Lim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/022,583

(22) Filed: Sep. 16, 2020

(65) Prior Publication Data

US 2021/0096652 A1   Apr. 1, 2021

Related U.S. Application Data

(60) Provisional application No. 62/907,421, filed on Sep. 27, 2019.

(51) Int. Cl.
| | |
|---|---|
| *G06F 3/01* | (2006.01) |
| *G02B 27/01* | (2006.01) |
| *G06F 3/03* | (2006.01) |
| *G06F 3/04815* | (2022.01) |
| *G06T 7/50* | (2017.01) |
| *G06V 40/10* | (2022.01) |
| *G06V 40/20* | (2022.01) |

(52) U.S. Cl.
CPC ......... *G06F 3/017* (2013.01); *G02B 27/0172* (2013.01); *G06F 3/013* (2013.01); *G06F 3/0304* (2013.01); *G06F 3/04815* (2013.01); *G06T 7/50* (2017.01); *G06V 40/107* (2022.01); *G06V 40/28* (2022.01)

(58) Field of Classification Search
CPC ........ G06F 3/017; G06F 3/013; G06F 3/0304; G06F 3/04815; G02B 27/0172; G06K 9/00375; G06T 7/50
See application file for complete search history.

(56) References Cited

U.S. PATENT DOCUMENTS

| | | | |
|---|---|---|---|
| 9,868,449 B1* | 1/2018 | Holz | ........... G06K 9/00355 |
| 2006/0244735 A1* | 11/2006 | Wilson | ........... G06F 3/0488 |
| | | | 345/173 |
| 2015/0062010 A1 | 3/2015 | Lin | |
| 2015/0253864 A1 | 9/2015 | Parkhomenko | |
| 2016/0054859 A1* | 2/2016 | Oshima | ........... G06F 3/0304 |
| | | | 345/175 |
| 2016/0132121 A1* | 5/2016 | Murase | ........... G06K 9/4604 |
| | | | 345/156 |

(Continued)

FOREIGN PATENT DOCUMENTS

| | | |
|---|---|---|
| CN | 105593787 A | 5/2016 |
| CN | 105745606 A | 7/2016 |

*Primary Examiner* — Andrey Belousov
(74) *Attorney, Agent, or Firm* — Blank Rome LLP

(57) ABSTRACT

Touch detection includes obtaining image data for a finger and a target surface, and determining a touch region in the image data on which the fingertip makes contact with the target surface. A pointing direction of the finger in the image data is determined, and a target region is estimated on the target surface based on the touch region and the pointing direction, wherein the touch region comprises a portion of the target surface that extends from the touch region in a direction of the pointing direction.

20 Claims, 7 Drawing Sheets

(56) References Cited

U.S. PATENT DOCUMENTS

| | | | |
|---|---|---|---|
| 2016/0179205 A1* | 6/2016 | Katz | G06F 3/013 |
| | | | 345/156 |
| 2016/0239126 A1* | 8/2016 | Midholt | G06F 3/044 |
| 2017/0075502 A1 | 3/2017 | Kurz | |
| 2018/0088674 A1 | 3/2018 | Chen | |
| 2018/0158249 A1* | 6/2018 | Kinstner | A63F 13/25 |

* cited by examiner

FINGER ORIENTATION TOUCH DETECTION

BACKGROUND

This disclosure relates generally to the field of touch detection, and more specifically to a touch detection based on finger orientation.

Today's electronic devices provide users with many ways to interact with the world around them. For example, users may interact with electronic devices using virtual or physical keyboards, mice, trackballs, joysticks, touch screens, and the like. One way that users often interact with digital information on their device is through a touch screen interface. Touch screen interfaces allow a user to interact with a display surface using a finger, stylus, or other object. A touch sensor recognizes the area touched and provides a response to a user.

With the rise of mixed reality environments, users often provide input by additional means in order to enable virtual objects to interact with real objects. As an example, a user may touch a real object in order to interact with the real object in a mixed reality manner. However, real objects often do not include touch sensors which are traditionally utilized to detect touch from a user. Although cameras can be used for visual touch detection, often a user may interact differently with a touch screen than with a plain surface when registering their intent.

SUMMARY

In one embodiment, a method for touch detection is described. The method may include obtaining image data of a finger and a target surface, and determining a touch region in the image data on which the fingertip makes contact with the target surface. A pointing direction of the finger in the image data is determined, and a target region is estimated on the target surface based on touch region and the finger direction, wherein the target region on the target surface comprises a portion of the target surface based on the touch region and the pointing direction.

In another embodiment, the method may be embodied in computer executable program code and stored in a non-transitory storage device. In yet another embodiment, the method may be implemented in an electronic device.

DETAILED DESCRIPTION

Figure 1:
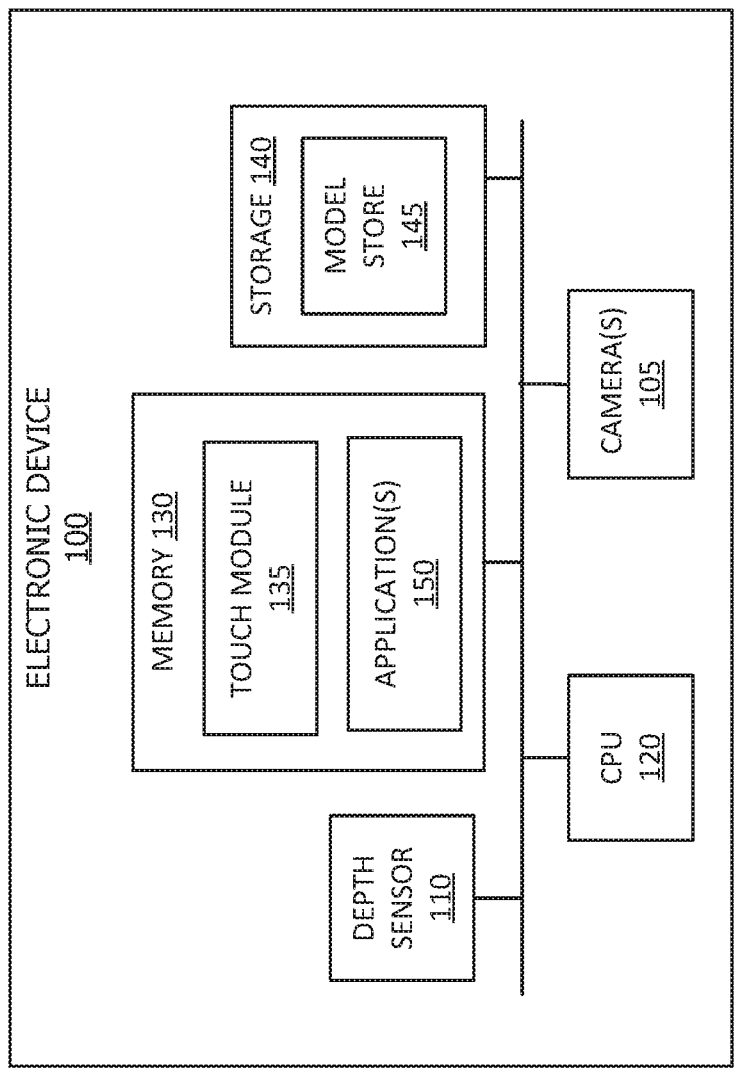
FIG. 1 shows, in block diagram form, a simplified system diagram according to one or more embodiments.

This disclosure is directed to systems, methods, and computer readable media for detecting touch in a physical environment. Augmenting any physical surface to be a touch screen would allow intuitive interactions between users, computing systems and the real surface. The interactive experience may be improved by incorporating a user's intent into determining a touched surface. According to one or more embodiments, finger direction may be used to determine a user's intention. For example, the direction a user points their finger indicates where the user would touch on the real surface. Further, according to one or more embodiments the user likely would not occlude a target region on the surface (that is, the portion of the touched surface the user is intending to bring attention to) by his or her finger. Proposed is a touch detection method which could provide user-friendly touch experience.

The following description describes a touch detection method which could provide a user-friendly and intuitive touch detection experience. In one embodiment, a touch status is determined based on a depth image that includes a finger and a target surface. In one or more embodiments, the depth image may be captured by a depth camera, or may be obtained from other types of images, such as RGB images. A fingertip position and a finger direction may be determined in the depth image. Further, the fingertip position and finger direction may be determined with respect to a common coordinate system, such as a global coordinate system, a coordinate system of the camera, a coordinate system of an electronic device, and the like. The finger direction may be determined by determining a hand position in the depth image and determining the finger direction based on the hand position and the fingertip position. In some embodiments, the direction of the finger may be a vector in 3D space, for example originating from a knuckle on a finger. The target surface may be identified from the image, and a target region in the depth image may be identified base on the determined finger direction and the fingertip position. In addition, a geometric property (such as a pose) of the target region may be determined.

Once the finger position and direction are determined, a fingertip region may be determined in the depth image base on the fingertip position. Depth information of the fingertip region may be process based on the estimated geometric property. In one or more embodiments, the fingertip region may include a region extending from the fingertip in the direction that the finger is pointing, such as the finger direction. The touch status may be determined based on the processed depth information of the fingertip region. The touch status may be determined based on an intended touch region on the target surface. In one or more embodiments, the target region may intersect with the finger direction in a 2D image coordinate system.

In one or more embodiments, the touch region may include digital information, and a detected touch may trigger an event based on the associated digital information. In one or more embodiments gaze direction for a user associated with the finger may be determined, for example, using a head mounted device. The position of the target region may further be based on the gaze direction, as well as the finger direction.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Referring to FIG. 1, a simplified block diagram of an electronic device 100 is depicted, in accordance with one or more embodiments of the disclosure. Electronic device 100 may be part of the multifunctional device, such as phone, tablet computer, personal digital assistant, portable music/video player, wearable device, base station, laptop computer, desktop computer, network device, or any other electronic device that has the ability to capture image data. FIG. 1 shows, in block diagram form, and overall view of a system diagram for a system capable of providing touch detection using visual means. Although not shown, electronic device 100 may be connected to additional devices capable of providing similar or additional functionality across the network, a wired connection, Bluetooth or other short-range connection, among others. As such, the various components and functionality described herein with respect to FIG. 1 may alternatively be distributed across multiple devices which may be communicatively coupled across a network.

Electronic device 100 may include a processor or processors, such as processing unit (CPU) 120. Processor 120 may be a system-on-chip such as those found in mobile devices and include one or more dedicated graphics processing units (GPUs). Further, processor 120 may include multiple processors of the same or different type. Electronic device 100 may also include a memory 130. Memory 130 may include one or more different types of memories, which may be used for performing device functions in conjunction with processor 120. For example, memory 130 may include cache, ROM, RAM, or any kind of transitory or non-transitory computer readable storage medium capable of storing computer readable code. Memory 130 may store various programming modules for execution by processor 120, including touch module 135. Electronic device 100 may also include storage 140. Storage 140 may include one or more non-transitory mediums including, for example, magnetic disks (fixed, floppy, and removable) and tape, optical media such as CD-ROMs and digital video discs (DVDs), and semi-conductor memory devices such as electronically programmable read-only memory (EPROM), and electrically erasable programmable read only memory (EEPROM). Storage 140 may include model store 145, which may include models of touch objects, such as a user's finger. It should be understood that according to one or more embodiments, the touch module 135 and the model store 145 may be stored or hosted in different locations with an electronic device 100. Further, in one or more embodiments, the touch module 135 and model store 145 may be stored in alternative or additional locations, for example in network storage.

In one or more embodiments, the electronic device 100 may include other components utilized for vision-based touch detection, such as one or more cameras 105 and/or other sensors such as depth sensor 110. In one or more embodiments, each of the one or more cameras 105 may be a traditional RGB camera, a depth camera, or the like. Further, cameras 105 may include a stereo or other multi camera system, a time-of-flight camera system, or the like which capture images from which depth information of the scene may be determined.

In one or more embodiments, electronic device 100 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes.

In one or more embodiments, touch module 135 may estimate whether a touch has occurred (e.g., contact has been made) between a touching object and a target surface. The touch module 135 may determine the likelihood that contact has been made between a touching object (such as a finger or fingertip) and a target surface. The touch module 135 may determine when a touch event occurs, for example, by obtaining depth information for a touching object and the target surface. As an example, the touch module 135 may receive or obtain depth information from the camera 105, the depth sensor 110, or other sensors. Further, the touch module 135 may determine touch information (such as by generating a depth map) from other data, such as stereo images captured by camera(s) 105, and the like. The touch module 135 may then determine, based on the signal, and estimation that a touch event has occurred. In one or more embodiments, the estimation may be based on a number of factors, such as by utilizing a predetermined model of a finger or other touching object (such as from a model store 145). In one or more embodiments, touch module 135 may also estimate the distance between a touching object and a target surface. According to one or more embodiments, raw touch data may indicate a likelihood that a touch has occurred based on, for example, a determined measured distance between the touching object and the target surface. A touch may be determined to have occurred, for example, based on a predetermined or dynamically determined threshold estimation value for determining a touch. Further, the touch status may be determined in relation to the target surface. In one or more embodiments, determining the pose of the target surface and the pose of the touching object in a common coordinate system may allow the touch module 135 to determine a relative distance between the touching object and the target surface and/or other components in the environment.

According to one or more embodiments, touch module 135 may determine not only when the touch has occurred, but also may identify a touch region of a target surface. In one or more embodiments, the touch module 135 may determine, for example based on depth information, a touch region in the image on which a fingertip, or other touching object, makes contact with the target surface. Further, the touch module 135 may determine a pointing direction of the touching object in the scene based on the first image data. As an example, the touch module 135 may determine a 3D ray indicating the 3D direction the finger or touching object is pointing when making contact with the target surface. The 3D ray may be determined, for example, based on depth information gathered from the cameras 105, and/or depth sensor 110. The orientation of the finger may be utilized to determine the direction of the finger. Then, a target region on the target surface may be estimated based on the touch region and the finger orientation. As such, the target region of the target surface may be different than the touch region of the target surface, according to one or more embodiments.

Although electronic device 100 is depicted as comprising the numerous components described above, in one or more embodiments, the various components and functionality of the components may be distributed across multiple devices. Particularly, in one or more embodiments, one or more of the touch module 135 and model store 145 may be disputed differently across the electronic device 100 or elsewhere in additional systems which may communicatively coupled to the electronic device 100. Further, in one or more embodiments, electronic device 100 may be comprised of multiple devices in the form of an electronic system. Accordingly, although certain calls and transmissions are described herein with respect to the particular systems, the various calls and transmissions may be differently directed based on the differently distributed functionality. Further, additional components may be used, or some combination of the functionality of any of the components may be combined.

Figure 2:
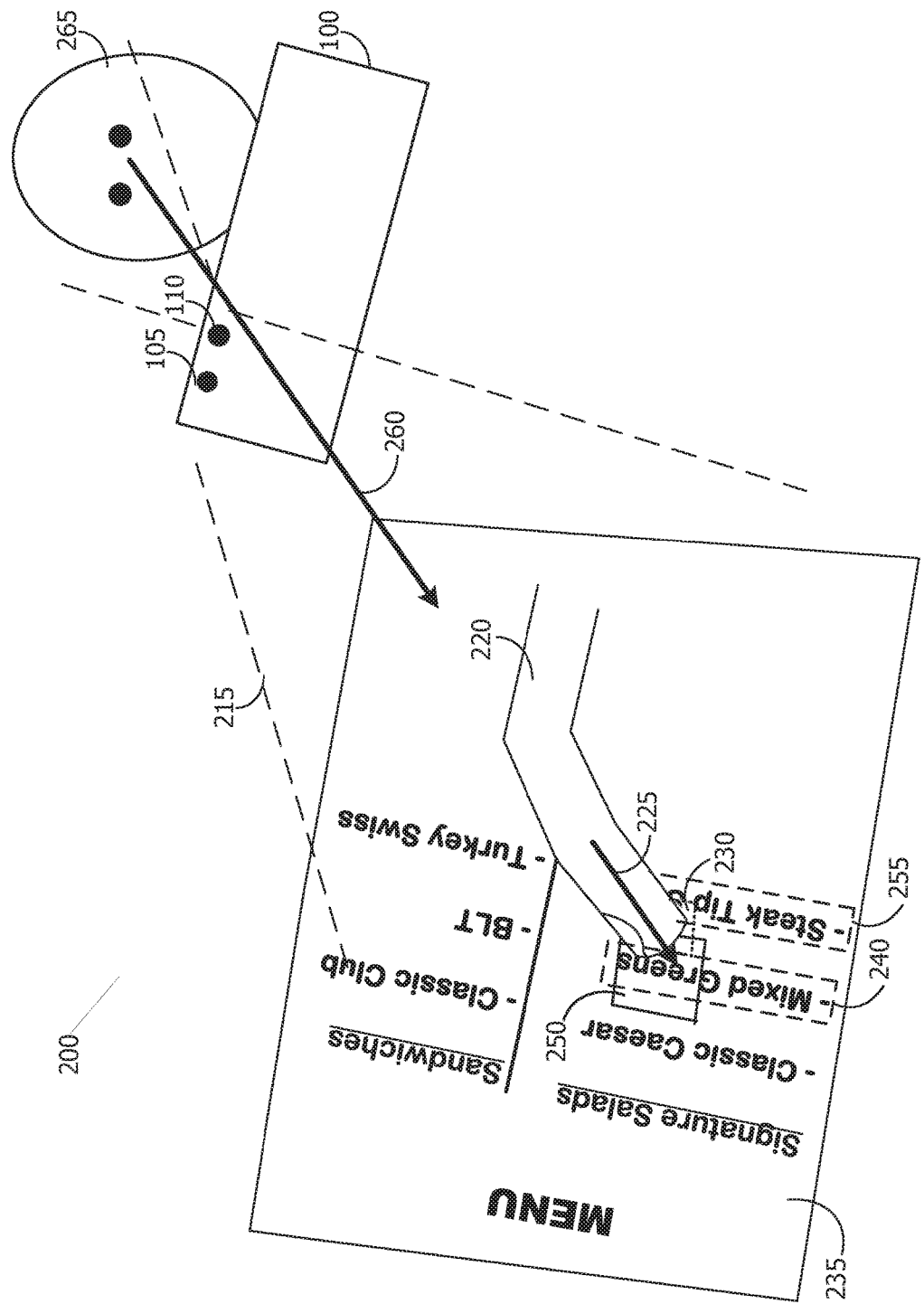
FIG. 2 shows, an example system setup for determining touch detection, according to one or more embodiments.

FIG. 2 shows an example system setup 200 in which techniques for estimating a target region may be determined. Specifically, FIG. 2 shows a user 265 utilizing an electronic device 100 to detect a touch between a touching object (e.g., the user's finger 220) and a target surface 235 (e.g., the menu). It should be understood that the system setup 200 is depicted primarily as an example to aid in the understanding of the techniques described herein.

In one or more embodiments, the target surface 235 may include one or more regions of interest. For purposes of the depicted example, the regions of interest may include region of interest 240 (e.g., the "Mixed Greens" portion of the menu), and region of interest 255 (e.g., the "Steak Tip Salad" portion of the menu). As depicted, the touching object 220 may make physical contact with the target surface 235 at a touch region 230. However, the target region 250 may comprise a different portion of the target surface than the touch region 230. Further, in one or more embodiments, the target region 250 and the touch region 230 may or may not overlap, in whole or in part.

According to one or more embodiments, the touch region 230 may be determined based on depth information captured by one or more cameras 105 and/or other depth sensors 110 of electronic device 100. According to one or more embodiments, electronic device 100 may capture image and/or other depth data that includes the touching object 220 and the targets surface 235, and may estimate a distance between the touching object 220 and target surface 235. In one or more embodiments, the camera(s) 105 may capture image data of the touching object 220 and target surface 235. Then, the electronic device 100 may utilize a model of the touching object 220 to determine a location of the touching object in 3D space. That is, by utilizing the model of the touching object 220, the electronic device can determine where in space the finger pad is located, even though the finger pad may not be visible in the image data due to being occluded by the top of the finger and/or top of the hand.

According to one or more embodiments, the touch module may utilize the determined touch region 230 to determine a target region 250 that is the subject of the user selection. In one or more embodiments, the target region 250 may be determined utilizing an orientation of the touching object 220, such as a finger orientation. In one or more embodiments, the finger orientation may be defined, at least in part, by a directional 3D ray 225 which indicates a pointing direction of the finger. As an example, the target region 250 may be determined based on the finger orientation at the time a touch is determined. Further, in one or more embodiments, the target region 250 may be determined, in part, based on the touch region 230. As an example, the target region 250 may be determined by refining the touch region 230 based on the finger orientation 225.

By utilizing the depth information captured from camera 105 and/or depth sensor 110, electronic device may determine not only that a touch event has occurred between the touching object 220 and the target surface 235, but a location on the target surface on which contact is made. As such, the model store 145 may include a model of the touching object 220 as is shown in the example diagram, contact is made at touch region 230. According to one or more embodiments, touch region 230 may or may not be indicative of a particular portion of target surface 235 which the user is attempting to select. In the example shown, the target surface 235 includes a menu with various menu items, which may be considered regions of interest on the target surface. Those menu items include a Mixed Greens salad and a Steak Tip salad as depicted, in this example, a user may be making contact with the target surface 235 in such a manner that the touch region 230 overlaps with steak tip salad portion of the menu at 255. However, in view of the scene shows that even though contact is being made with the stake to salad portion of the menu at 255, the user's finger 220 is pointing towards the Mixed Greens salad 240. According to one or more embodiments, the user may be making contact with the steak tips salad region 255 of the target surface 235, while intending to show interest in the Mixed Greens salad region 240 of the target surface 235. As such, a target region 250 must be determined based on finger orientation as well as the touch region.

According to one or more embodiments, the target region 250 may additionally be determined based on a gaze direction of the user. For example, a gaze vector 260 may be determined by the electronic device 100. As an example, image data may be captured by a user-facing camera in which a direction of the user's eyes may be determined. The direction of the user's eyes may be determined, for example, in a coordinate system associated with the electronic device 100 or some other coordinate system in which the gaze vector 260 may be determined with the finger orientation 225. In one or more embodiments the gaze direction may be used to refine the target region. As an example, if the user is looking in a substantially similar direction to the finger orientation, then the target region may be more accurate than if the gaze direction is in a much different direction than the finger orientation. If the gaze direction 260 and finger orientation 225 are substantially different (e.g., if the difference in a 3D direction of the gaze and a 3D direction of the finger orientation satisfies a predetermined threshold), then the target region may be refined in the direction of the gaze 260.

Figure 3:
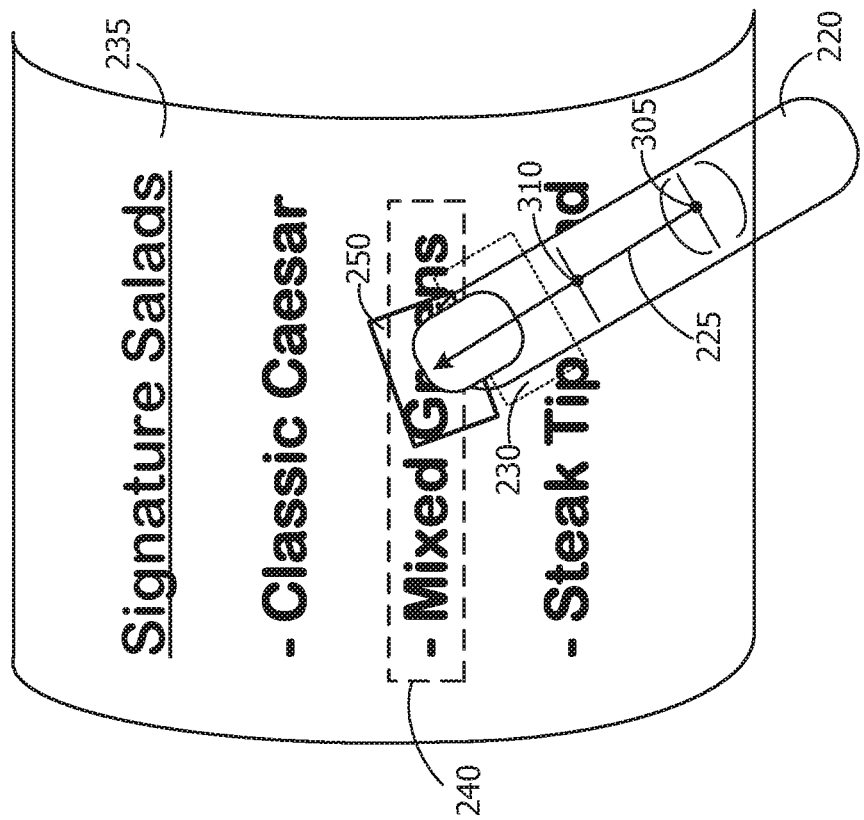
FIG. 3 shows an example target surface and touching object, according to one or more embodiments.

FIG. 3 shows an example target surface and touching object, according to one or more embodiments. FIG. 3 shows an alternative view of the environment described above with respect to FIG. 2. Specifically, FIG. 3 shows a view of a target surface 235 and a touching object 220. Further, FIG. 3 depicts a touch region 230 and a target region 250, which overlaps with a region of interest 240.

In one or more embodiments, the target region 250 may be determined based on a touch region 230 and a finger orientation 225. As described above, the target region may be determined based on a finger orientation when a touch is detected. Further, according to one or more embodiments, the target region 250 may be determined by refining the touch region 230. That is, the target region 250 may be defined as the touch region, and then refined based on additional factors, such as pointing direction and gaze direction.

According to one or more embodiments, the target region 250 may be determined based on a direction of the finger orientation 225. According to one or more embodiments, the finger orientation may be determined based on a 3D directional vector that passes through one or more joints of the finger, such as joint 305 and joint 310, and/or a fingertip of the finger 220. According to one or more embodiments, the target region 250 may be determined based on a point in space in which the 3D ray 225 passes through the target surface 235. According to one or more embodiments, a geometric property of the surface may be estimated to determine a depth of the surface in relation to the electronic device 100 in order to determine a point in space at which the finger direction vector intersects the target surface 235.

As shown, it becomes clear that even though the touch region 230 overlaps "Steak Tip Salad" portion of the target surface 235, the intended object to be selected is the "Mixed Greens" portion 240. By considering the finger orientation as well as the detected touch, the target region 250 provides a more accurate estimation of a selected portion of a target surface 235. According to one or more embodiments, the selected portion (e.g., "Mixed Greens" 240) may be associated with digital information as such, upon detecting selection of the particular region of interest (e.g., "Mixed Greens" 240) an event may be triggered based on digital information associated with the region of interest.

Figure 4:
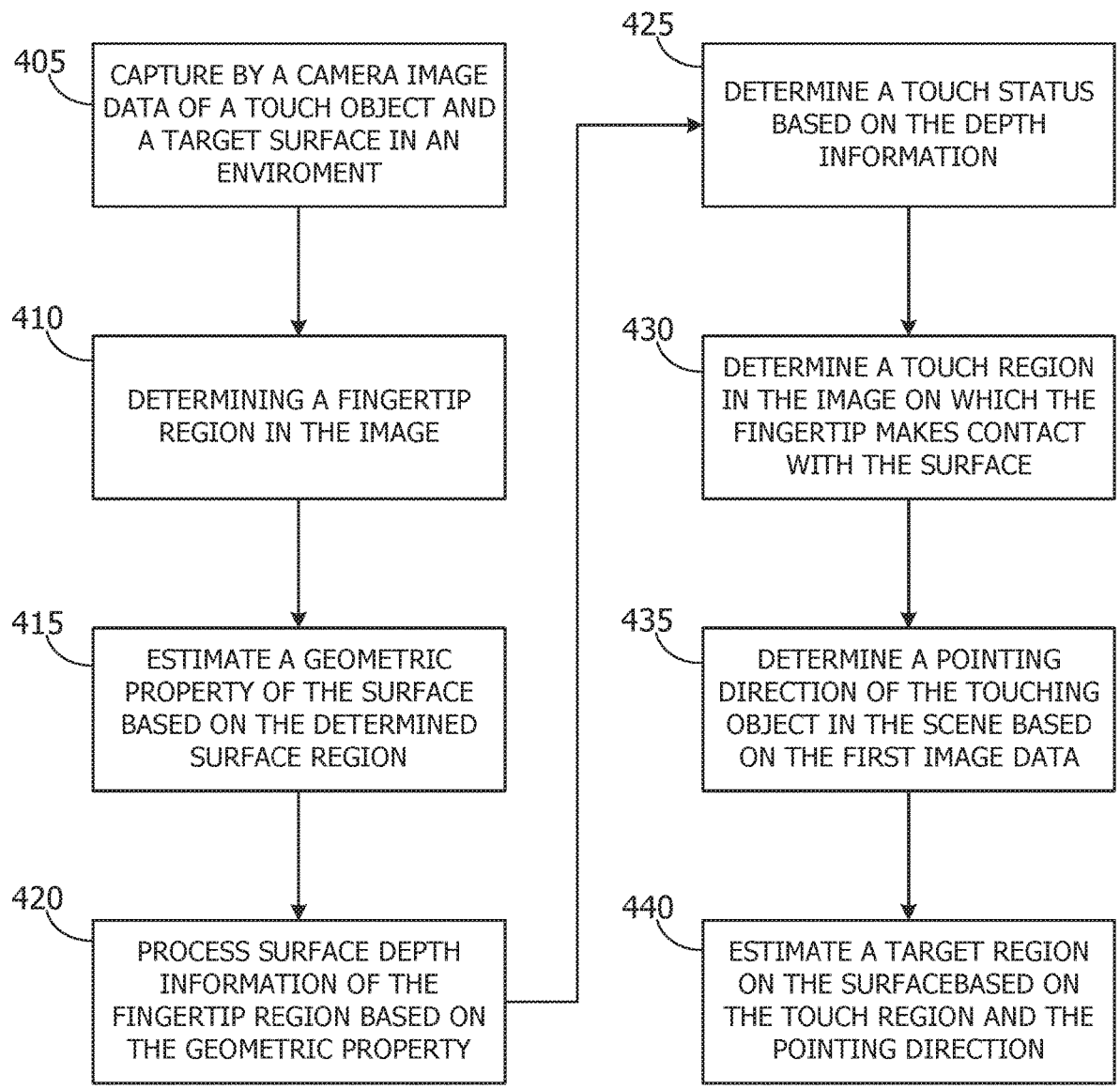
FIG. 4 shows, flow chart form, an example technique for detecting a touch using a finger orientation, in accordance with one or more embodiments.

FIG. 4 shows, and flowchart form, an example technique for estimating a target region for a touch between a touching object and a target surface, in accordance with one or more embodiments. For purposes of explanation, the following steps will be described in the context of FIG. 1. However, it should be understood that the various actions may be performed by alternate components. In addition, the various actions in a different order. Further, some actions may be performed simultaneously, and some may not be required, or others may be added.

The flowchart begins at 405 where electronic device 100 captures by camera 105 image data the touching object and a target surface in an environment from the first viewpoint. As an example, cameras 105 may be facing the environment in a manner in which the touching object and the target surface are located. Further, in one or more embodiment, additional data may be captured, such as depth information, and the like.

The flowchart continues at 410, where the touch module 135 determines a fingertip region in the image. As described above, the electronic device 100 may access a model of a touching object, such as a finger. The model may be a model of a generic finger or a specific finger, and may be used in conjunction with image data and/or depth data to determine a location in the environment in which the fingertip is located.

At 415, the touch module 135 estimates a geometric property of the surface based on the determined fingertip region. According to one or more embodiments, a depth of the surface may be determined over which a finger may be touching or hovering. In one or more embodiments, depth information of the surface may be determined, for example using a model of the surface, or depth information for the surface captured in association with the image data and/or other depth data. The geometric property may include a point in space at which the target surface is located behind the touching object, in relation to the electronic device 100.

The flowchart continues at 420 where the touch module 135 processes surface depth information of the fingertip region based on the geometric property. According to one or more embodiments, the pose of the touching object may be determined, for example, in relation to the target surface, in relation to the electronic device, or the like. Further, in one or more embodiments, the pose of the touching object may be determined, for example, based on a coordinate system of the electronic device, a real world coordinate system, a coordinate system of the target surface, or the like.

At 425 the touch module 135 determines a touch status based on the depth information. According to one or more embodiments, the touch module 135 determines a touch region in the image on which the fingertip makes contact with the surface. Determining where the fingertip makes contact with the surface may involve determining a pose of the finger. In one or more embodiments, depth information of the surface may be determined, for example using a model of the surface, or depth information for the surface captured in association with the image data and/or other depth data. As such, a gap distance between the touching object and the target surface calculated based on a determine depth of the fingertip or other touching object as compared to the target surface over which the touching object is located. In one or more embodiments, the gap distance may be utilized to estimate the likelihood of a touch, or otherwise make a determination as to whether a touch has occurred.

The flowchart continues at 430 where the touch module 135 determines a touch region in the image on which the fingertip makes contact with the surface. In one or more embodiments, the touch region may be determined as the portion of the target surface over where the fingertip is hovering/touching when it is determined at 425 that a touch has occurred.

The flowchart continues at 435, where the touch module 135 determines a pointing direction of the touching object in the scene based on the image data. As described above, the pointing direction may be determined as a 3D directional ray corresponding to the pointing direction of the finger. In one or more embodiments, the pointing direction (e.g., the finger orientation) may be determined by identifying joints in the finger and/or the fingertip, from which the ray is determined.

At 425 a target region is estimated based on the touch region and the pointing direction. The target region may be determined in a variety of ways. As an example, the target region 250 may be determined based on the finger orientation 220 at the time a touch is determined. Further, in one or more embodiments, the target region 250 may be determined, in part, based on the touch region 230. As an example, the target region 250 may be determined by refining the touch region 230 based on the finger orientation 225. The target region may be determined as a portion of the target surface that is offset from the touch region in the direction of the finger orientation. As another example, the target region may be a portion of the target surface at which a 3D directional ray associated with a pointing direction of the finger intersects the target surface, or may be a portion of the target surface offset from the touch region 230 in the direction of the finger orientation 225.

Figure 5:
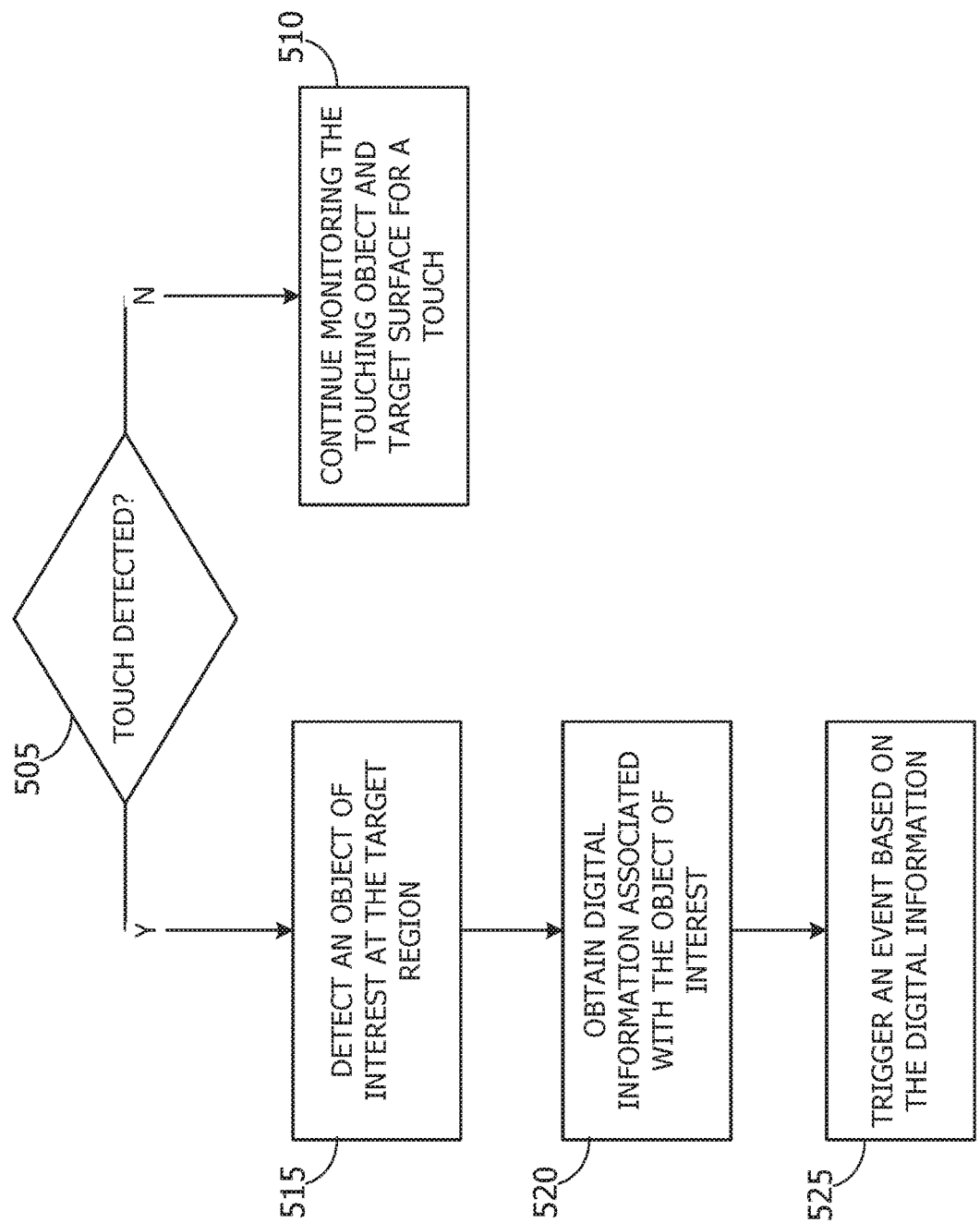
FIG. 5 shows, in flow chart form, an example technique for triggering an event based on a detected touch, according to one or more embodiments.

FIG. 5 shows, in flow chart form, an example technique for triggering an event based on a detected touch, according to one or more embodiments. For purposes of explanation, the following steps will be described in the context of FIG. 1. However, it should be understood that the various actions may be performed by alternate components. In addition, the various actions in a different order. Further, some actions may be performed simultaneously, and some may not be required, or others may be added.

The flowchart begins at 505 where a determination is made regarding whether a touch has been detected. A touch may be detected, for example, as described above with respect to FIG. 4. If a touch is not detected, then the flowchart continues to 510 and the touch module 135 continues monitoring the touching object and the target surface for a touch.

Returning to 505, if a determination is made that a touch is detected, then the flowchart continues at 515 and the touch module 135 detects an object of interest at the target region. In one or more embodiments, the target region may be determined, for example, as described above with respect to FIG. 4. When the target region is detected, an object of interest may be determined. The object of interest may be, for example, a particular portion of the target surface, or a physical object.

The flowchart continues at 520 where the touch module 135 obtains digital information associated with the object of interest. In one or more embodiments, the digital information may be information related to a visual item at the target region. As another example, the target region may include an indication such as a QR code or other indication which is associated with additional content. Digital information may be obtained based on the indication, in some embodiments.

The flowchart concludes at 525 where the touch module 135 triggers an event based on the digital information. As another example, the digital information may be computer code utilized to activate an application, access web-based content, and the like. As another example, a notification may be generated and transmitted base don the digital information. Returning to the menu example, if a user points to a particular menu item, a message may be transmitted to a restaurant that a user wishes to purchase the selected menu item.

Figure 6:
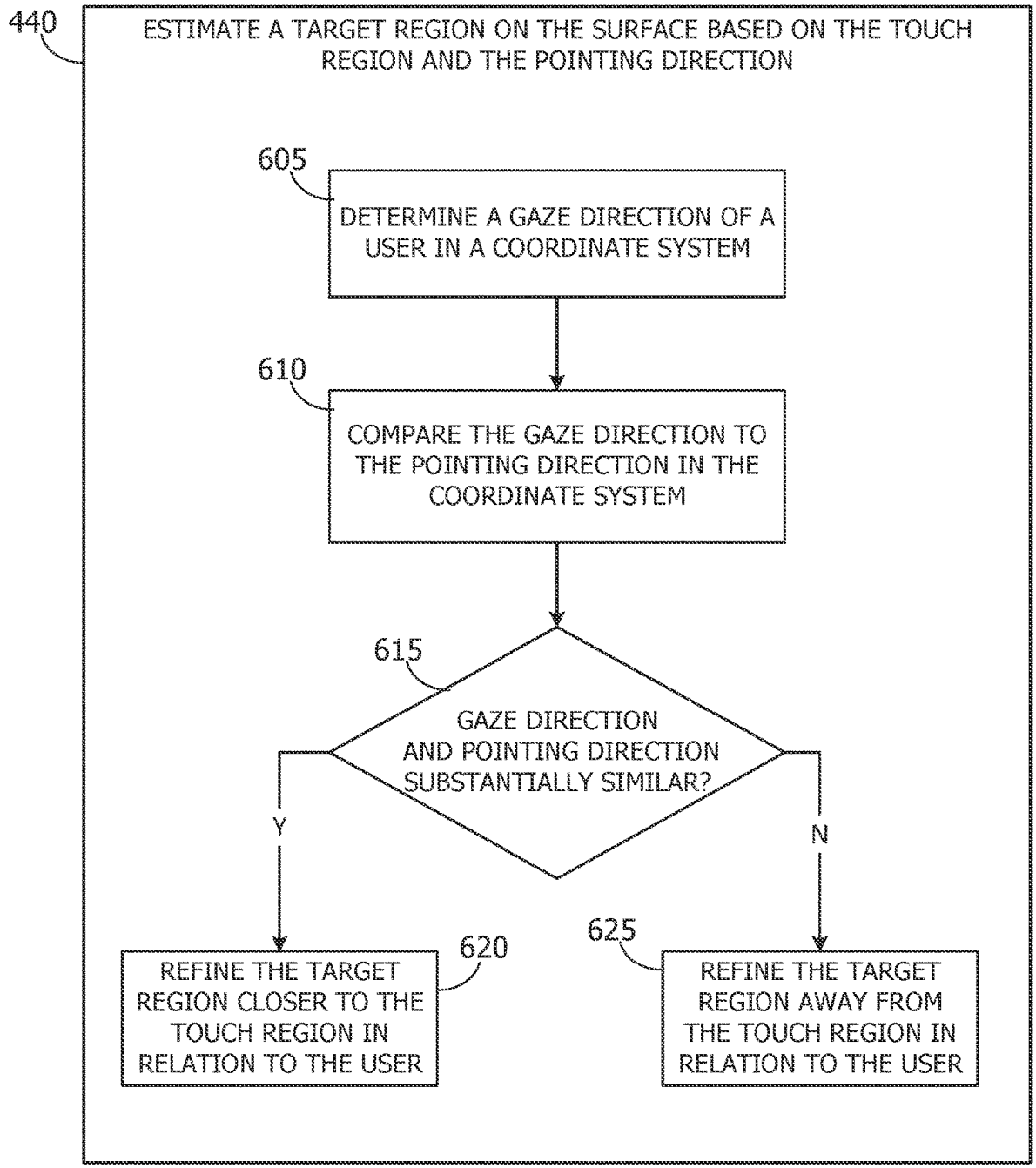
FIG. 6 shows, in flow chart form, an example technique for utilizing gaze direction for detecting touch, according to one or more embodiments.

FIG. 6 shows, in flow chart form, an example technique for utilizing gaze direction for detecting touch, according to one or more embodiments. More specifically, FIG. 6 depicts a detailed technique for estimating a target region on a surface based on the touch region and the pointing direction, according to one or more embodiments. According to one or more embodiments, a more accurate determination of the target region may be determined, for example, by taking into consideration a gaze direction of the user that is utilizing the described technique. As an example, in one or more embodiments, if the touch region is above the gaze of the user (e.g., the user is reaching up to make contact with the target surface), then the target region may be refined to be further away from the user than the target surface. As another example, if the touch region is below the user's eyes, then the target region may be refined to be closer to the touch region in relation to the user.

The flowchart begins at 605 where the touch module 135 determines a gaze direction of a user in a particular coordinate system. In one or more embodiments, the gaze direction may be determined in a coordinate system of a detecting device, in a coordinate system related to a target surface, in a universal coordinate system, and the like. The gaze direction may be determined, for example, based on image data captured by a camera 105 of electronic device 100. As an example, cameras 105 may include a front facing camera and a back facing camera, where one camera captures an image of the target surface and touching object, whereas the other camera may capture an image of a user's eyes to determine the direction the user is looking. In one or more embodiments, additional or alternative data may be used to determine a gaze direction of the user, for example using depth sensor 110 or other sensors.

The flowchart continues at 610 where the touch module 135 compares the gaze direction to the pointing direction in the coordinate system from 605. In one or more embodiments, the gaze direction and the pointing direction may be determined in different coordinate systems and the touch module 135 may translate the multiple coordinate systems into a single common coordinate system.

At 615, a determination is made regarding whether the gaze direction and the pointing direction are substantially similar. The gaze direction and pointing direction may be substantially similar, for example, if the 3D ray determine for the pointing direction is substantially similar to a ray determined for the gaze direction. The gaze direction and pointing direction may be substantially similar, for example, if a difference between the gaze ray and the pointing ray satisfies a predetermined threshold.

If at 615, a determination is made that the gaze direction and the pointing direction are substantially similar, then the flowchart continue at 620 and the touch module 135 refines the target region closer to the touch region in relation to the user. In one or more embodiments, an initial determination for a target region may be determined based on the touch direction of a user. Here, the target region may be refined to be closer to the user than the touch region. As described above, if a target region is above a user's eye, then the target region is likely further away from the user than a default determination for a target region.

Returning to 615, if a determination is made that the gaze direction and the pointing direction are not substantially similar, then the flowchart continues at 625 where the touch module 135 refines the target region to be away from the touch region in relation to the user. That is, the target region may be refined to be farther away from the user than the touch region. According to one or more embodiments, the gaze direction and pointing direction may not be in a substantially similar direction, for example, if the target region is below eye level of the user.

According to one or more embodiments, a determination may additionally, or alternatively, be made regarding a direction of the user's gaze. As an example, if the gaze direction is down (e.g., in a direction below the user's head), then the target region may be refined to be closer to the touch region in relation to the user. The gaze direction may be determined, for example, based on a real-world coordinate system. Conversely, if the gaze direction is determined to be up (e.g., in a direction above the user's head), then the target region may be refined to be farther away from the touch region in relation to the user.

Figure 7:
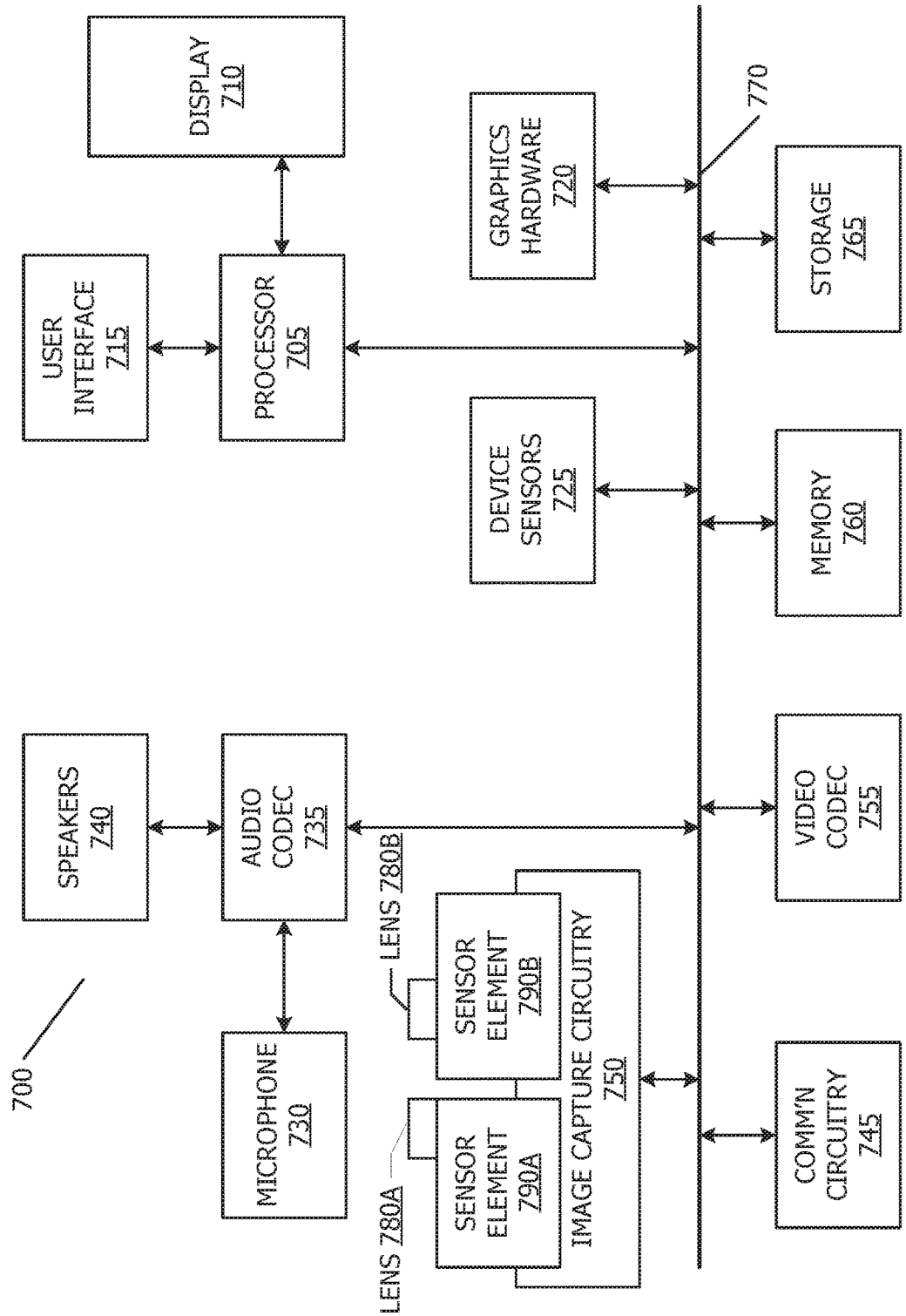
FIG. 7 shows, in block diagram form, a simplified multifunctional device according to one or more embodiments.

Referring now to FIG. 7, a simplified functional block diagram of illustrative multifunction electronic device 700 is shown according to one embodiment. Each of electronic device 100 may be a multifunctional electronic device, or may have some or all of the described components of a multifunctional electronic device described herein. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system) video codec(s) 755 (e.g., in support of digital image capture unit), memory 760, storage device 765, and communications bus 770. Multifunction electronic device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by device 700 (e.g., such as the generation and/or processing of images as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780A and 780B, where each lens assembly may have a separate focal length. For example, lens assembly 780A may have a short focal length relative to the focal length of lens assembly 780B. Each lens assembly may have a separate associated sensor element 790. Alternatively, two or more lens assemblies may share a common sensor element. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within circuitry 745. Images so captured may be stored in memory 760 and/or storage 765.

Sensor and camera circuitry 750 may capture still and video images that may be processed in accordance with this disclosure, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   obtain image data for a finger and a target surface;
   identify a touch region on the target surface where the finger makes contact with the target surface;
   determine a directional 3D ray consistent with a pointing direction of the finger in the image data;
   estimate a target region based on a point in space at which the directional 3D ray passes through the target surface, wherein the point in space is determined based on an estimated depth of the target surface, and wherein the target region is different from the touch region;
   determine a touch status based on the estimated depth of the target surface; and
   trigger an event based on the touch status, wherein the event is based on the target region.

2. The non-transitory computer readable medium of claim 1, further comprising computer readable code to:
   estimate a geometric property of the target surface based on the estimated target region;
   process surface depth information of the target region based on the geometric property; and
   determine the touch status based on the target surface depth information.

3. The non-transitory computer readable medium of claim 2, further comprising computer readable code to:
   provide digital information associated with the target region; and
   trigger an event based on the associated digital information and the touch status.

4. The non-transitory computer readable medium of claim 1, wherein the computer readable code to determine the pointing direction of the finger further comprises computer readable code to:
  detect a first joint and a second joint of the finger in the image data,
  wherein the pointing direction is further determined according to a point in space of each of the first joint and the second joint.

5. The non-transitory computer readable medium of claim 1, wherein the computer readable code to determine the pointing direction of the finger further comprises computer readable code to:
  detect a hand position in the image data,
  wherein the pointing direction is further determined according to the hand position.

6. The non-transitory computer readable medium of claim 1, further comprises computer readable code to:
  detect a gaze vector of a user associated with the finger; and
  refine the target region according to the gaze vector.

7. The non-transitory computer readable medium of claim 1, wherein the image data comprises a depth image obtained by a head mounted device.

8. A system for detecting touch, comprising:
  one or more processors; and
  one or more computer readable media comprising computer readable code executable by the one or more processors to:
    obtain image data for a finger and a target surface;
    identify a touch region on the target surface where the finger makes contact with the target surface;
    determine a directional 3D ray consistent with a pointing direction of the finger in the image data;
    estimate a target region based on a point in space at which the directional 3D ray passes through the target surface, wherein the point in space is determined based on an estimated depth of the target surface, and wherein the target region is different from the touch region;
    determine a touch status based on the estimated depth information; and
    trigger an event based on the touch status, wherein the event is determined based on the target region.

9. The system of claim 8, further comprising computer readable code to:
  estimate a geometric property of the target surface based on the estimated target region;
  process surface depth information of the target region based on the geometric property; and
  determine the touch status based on the target surface depth information.

10. The system of claim 9, further comprising computer readable code to:
  provide digital information associated with the target region; and
  trigger an event based on the associated digital information and the touch status.

11. The system of claim 8, wherein the computer readable code to determine the pointing direction of the finger further comprises computer readable code to:
  detect a first joint and a second joint of the finger in the image data,
  wherein the pointing direction is further determined according to a point in space of each of the first joint and the second joint.

12. The system of claim 8, wherein the computer readable code to determine the pointing direction of the finger further comprises computer readable code to:
  detect a hand position in the image data,
  wherein the pointing direction is further determined according to the hand position.

13. The system of claim 8, further comprises computer readable code to:
  detect a gaze vector of a user associated with the finger; and
  refine the target region according to the gaze vector.

14. A method for detecting touch, comprising:
  obtaining image data for a finger and a target surface;
  identifying a touch region on the target surface where the finger makes contact with the target surface;
  determining a directional 3D ray consistent with a pointing direction of the finger in the image data;
  estimating a target region based on a point in space at which the directional 3D ray passes through the target surface, wherein the point in space is determined based on an estimated depth of the target surface, and wherein the target region is different from the touch region;
  determining a touch status based on the estimated depth of the target surface; and
  triggering an event based on the touch status, wherein the event is based on the target region.

15. The method of claim 14, further comprising:
  estimating a geometric property of the target surface based on the estimated target region;
  processing surface depth information of the target region based on the geometric property; and
  determining the touch status based on the target surface depth information.

16. The method of claim 15, further comprising:
  providing digital information associated with the target region; and
  triggering an event based on the associated digital information and the touch status.

17. The method of claim 14, wherein determining the pointing direction of the finger further comprises:
  detecting a first joint and a second joint of the finger in the image data,
  wherein the pointing direction is further determined according to a point in space of each of the first joint and the second joint.

18. The method of claim 14, wherein determining the pointing direction of the finger further comprises:
  detecting a hand position in the image data,
  wherein the pointing direction is further determined according to the hand position.

19. The method of claim 14, wherein determining the pointing direction of the finger further comprises:
  detecting a gaze vector of a user associated with the finger; and
  refining the target region according to the gaze vector.

20. The method of claim 14, wherein the image data comprises a depth image obtained by a head mounted device.

* * * * *